Oct. 22, 1968 N. A. STEADSON 3,407,313

MONOSTABLE MULTIVIBRATOR WITH AN AUXILIARY TRANSISTOR IN THE TIMING CIRCUIT FOR BROADENING THE OUTPUT PULSES

Filed March 22, 1965

INVENTOR.
NEIL A. STEADSON

BY Frank R. Trifari

AGENT

United States Patent Office 3,407,313

Patented Oct. 22, 1968

3,407,313

MONOSTABLE MULTIVIBRATOR WITH AN AUXILIARY TRANSISTOR IN THE TIMING CIRCUIT FOR BROADENING THE OUTPUT PULSES

Neil Albert Steadson, North Sydney, New South Wales, Australia, assignor to North American Philips Company, Inc., New York, N.Y., a corporation of Delaware Filed Mar. 22, 1965, Ser. No. 441,440
Claims priority, application Australia, Mar. 16, 1964, 42,096/64
3 Claims. (Cl. 307—273)

ABSTRACT OF THE DISCLOSURE

The invention is concerned with a transistor monostable multivibrator of the type where the output pulse duration is determined by the discharge of a timing capacitor through a series connected timing resistor. A second resistor shunted by the base-emitter path of a transistor is connected in series between the timing resistor and timing capacitor to increase the output pulse duration without increasing the value of the capacitor.

The present invention relates to multivibrators having a first transistor and a second transistor of the same conductivity type and a timing capacitor included between the collector of the second transistor and the base of the first transistor which timing capacitor is charged via a charging resistor in the collector circuit of the second transistor when the second transistor is in a non-conducting condition and is discharged via a timing resistance connected between the base of the first transistor and a point of fixed potential when the second transistor is in a conducting condition, the rate of discharge of the timing capacitor determining the time during which the first transistor after being brought out of its conducting condition remains non-conducting.

Such multivibrators are known. One such multivibrator is illustrated in FIGURE 2 on page 255 of the publication, "Mullard Reference Manual of Transistor Circuits," second edition, 1961, and another such multivibrator is illustrated in FIGURE 5 on page 258 of the same publication. Other such multivibrators are also known, in some cases comprising more than two transistors.

With known such multivibrators the value of the timing resistance connected between the base of the first transistor and a point of fixed potential determines the magnitude of the base current which flows in the first transistor when the first transistor is in a conducting condition so that the maximum resistance value of the timing resistance is limited. Also with known such multivibrators the capacitance value of the timing capacitor is limited to a maximum value of 2 microfarads or so if accurate timing of the multivibrator is desired and the use of an electrolytic capacitor is to be avoided.

Since the maximum value of the timing resistance is limited and the maximum value of the timing capacitor is also limited, a limitation is placed on the time during which the first transistor after being brought out of its conducting condition remains non-conducting.

An object of the present invention is to overcome the abovementioned disadvantage.

In accordance with the present invention the end of the timing resistance remote from the point of fixed potential is connected to an auxiliary point of fixed potential, the auxiliary point of fixed potential having a potential such that the current which flows from the auxiliary point of fixed potential through the timing resistance flows in the same direction through the timing resistance as does discharge current from the timing capacitance, the end of the timing resistance remote from the first mentioned point of fixed potential being connected to the auxiliary point of fixed potential via the collector/emitter path of a third transistor the base/emitter path of which shunts a resistance included in the discharge path of the timing capacitance.

In order that the invention may readily be carried into effect, an embodiment of the invention will now be described, by way of example with reference to the accompanying diagrammatic drawings in which.

Figure 1:
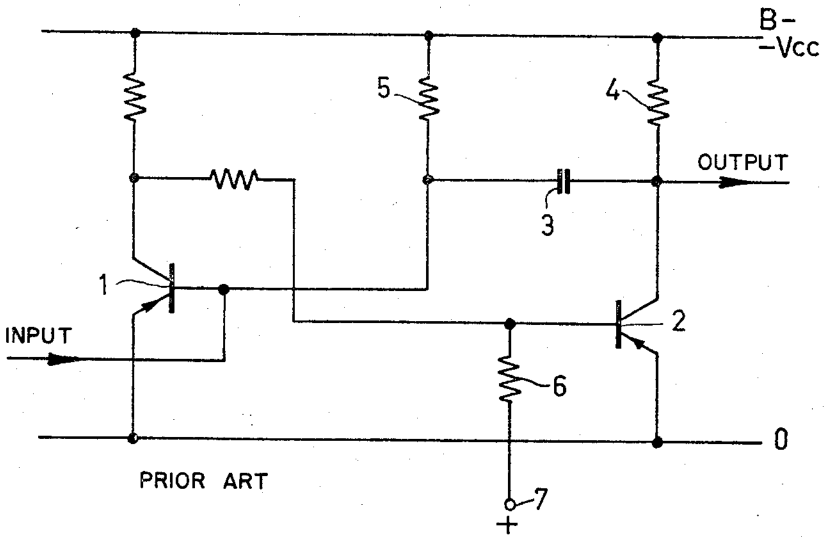
FIGURE 1 shows the circuit diagram of a known type of monostable multivibrator.

The operation of the monostable multivibrator illustrated in FIGURE 1 is well known and briefly is as follows. A first transistor 1 is biased so as to be conducting during the rest condition, and a second transistor 2 is biased so as to be cut off in the rest condition, resistor 6 being connected to a positive point of fixed potential 7 for the latter purpose.

During the rest condition the timing capacitor 3 is charged via the emitter/base path of the transistor 1 and the charging resistor 4 from the voltage supply sources (not shown) connected between the points indicated by B— and 0 and the capacitor 3 is charged to a voltage substantially equal to the voltage V*cc* of the supply source.

In the event of the circuit being triggered, for example by the application of a positive triggering pulse to the base of transistor 1, transistor 1 is cut off, the collector voltage of transistor 1 becomes more negative causing the base voltage of transistor 2 to become more negative also. The change in base voltage of transistor 2 is sufficient to cause transistor 2 to become conductive. When transistor 2 commences to conduct, substantially the whole of the voltage V*cc* of the supply source is developed across resistor 4 so that capacitor 3 commences to discharge via timing resistor 5 from +V*cc* towards —V*cc*. Transistor 2 remains conducting and transistor 1 remains cut off until the potential at the base of transistor 1 becomes approximately zero potential i.e. until the capacitor C3 has discharged approximately half way from V*cc* towards —V*cc*. As soon as transistor 1 commences to conduct once more the collector voltage of transistor 1 decreases, the base voltage of transistor 2 becomes more positive, transistor 2 is cut off, and the circuit is in a rest condition once more. When transistor 2 is cut off again capacitor 3 becomes charged once more via resistor 4 whereupon the circuit is in condition to be triggered again.

The period of time which elapses between the instant that transistor 2 becomes conductive and the instant that transistor 2 is cut off is known as the "on" time and the period of time that elapses between the instant that transistor 2 is cut off and the instant that the circuit is in a condition to be triggered once more is known as the "recovery time" of the circuit.

The "on" time of the circuit illustrated in FIGURE 1 is determined by the capacitance value of capacitor 3 and the resistance value of resistor 5. The maximum value of resistor 5 is limited by the base current required for transistor 1 and the maximum value of capacitor 3 is limited to about 2 microfarads or so if the use of an electrolytic capacitor is to be avoided and if the use of an expensive capacitor is to be avoided, consequently the "on" time of the circuit is limited.

In practice the "on" time is limted to about 1.5 seconds.

The "recovery time" of the circuit illustrated in FIGURE 1 is determined by capacitor 3 and resistor 4. For practical purposes the "recovery time" may be considered as being $4C_3R_4$. If capacitor 3 is given a large value of capacitance in order to obtain a long "on" time the recovery period is also lengthened.

By means of the present invention capacitor 3 may be discharged at a slower rate than the rate determined by capacitor 3 and resistor 5 so that it is possible to obtain a longer "on" time. Alternatively it is possible to obtain the same "on" time using a capacitor of smaller capacitance value in place of capacitor 3 thereby obtaining a shorter "recovery time."

Figure 2:
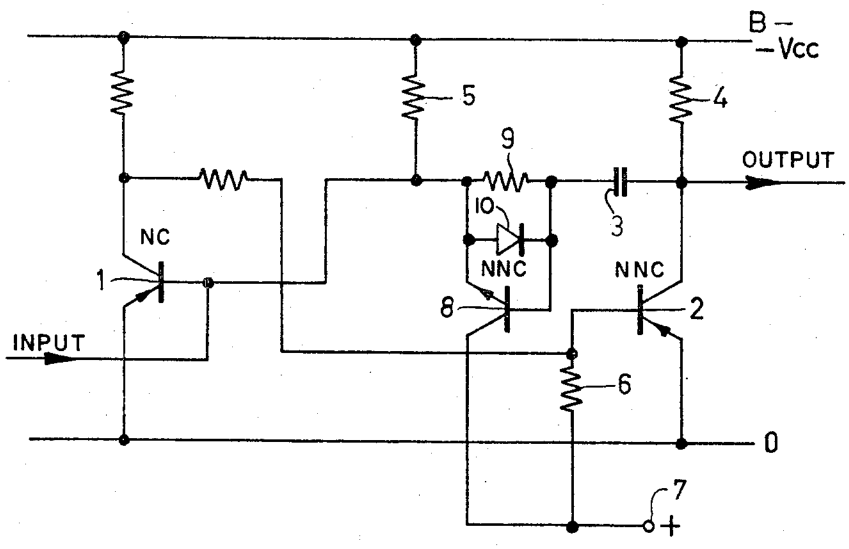
FIGURE 2 shows a monostable multivibrator embodied with the present invention.

Referring now to FIGURE 2 which illustrates a monostable multivibrator embodying the present invention. The circuit illustrated is somewhat similar to the circuit illustrated in FIGURE 1 and similar parts of the circuit have been designated by a similar numeral, in accordance with the present invention the emitter collector path of a third transistor 8 is connected from the base of transistor 1 to the point of fixed potential 7, the emitter of transistor 8 being connected to the base of the transistor 1 and the collector of the transistor 8 being connected to the point 7. A resistor 9 is included in the discharge path of capacitor 3 between the capacitor 3 and the base of transistor 1. A diode 10 is connected in parallel with the resistor 9. The emitter/base path of transistor 8 shunts the resistor 9 and diode 10. The transistor 8 is of a conductivity type opposite to that of the transistor 1 and the transistor 2.

With the circuit illustrated in FIGURE 2, the transistor 8 is cut off unless capacitor 3 is discharging. When the capacitor 3 is discharging via the resistor 9 and the resistor 5, the voltage drop across the resistor 9 causes the transistor 8 to become conducting whereupon current flows from the point 7 via the emitter/collector path of the transistor 8 and the resistor 5 to B— thereby causing a voltage drop across resistor 5. At this time diode 10 is back-biased and not conducting. The voltage drop across the resistance 5 has a direction such that the discharge of the capacitor 3 is opposed, consequently the magnitude of discharge current flowing from capacitor 3 is reduced and the time required for capacitor 3 to discharge by a sufficient amount for transistor 1 to become conducting is prolonged in comparison with time taken by capacitor 3 in the circuit arrangement illustrated in FIGURE 1 to discharge by a similar amount.

The resistor 9 may be a variable or an adjustable resistance.

With the circuit arrangement illustrated in FIGURE 2 since the "recovery time" of the circuit depends inter alia upon the resistance of the resistor 9, the "recovery time"

is shortened by shunting the resistor 9 by the diode 10 connected so that its direction of conductivity is opposite to that of the base/emitter path of the transistor 8. If the recovery time is not critical, diode 10 may be omitted.

What is claimed is:

1. In a multivibrator of the type having a loop circuit including a capacitor and a first resistor for limiting the flow of unidirectional current through said capacitor, wherein the current flow through said capacitor determines the duration of a quasi-stable state of said multivibrator, said first resistor connected to a first point of constant potential, the improvement wherein said loop circuit further comprises a second resistor connected in series between said first resistor and said capacitor for producing a voltage drop across said second resistor as a function of said current through said capacitor, and a transistor having base, emitter and collector electrodes, said collector of said transistor connected to a second point of constant potential different from said first potential, the emitter of said transistor connected between said first resistor and said second resistor, the base of said transistor connected between said capacitor and said second resistor for providing, through said collector-emitter electrodes of said transistor, an additional current through said first resistor flowing in the same direction as said unidirectional loop current, for further limiting said flow of loop current through said capacitor.

2. A multivibrator as claimed in claim 1, wherein said second resistor is a variable resistor.

3. A multivibrator as claimed in claim 2 further including a diode connected in parallel with said second resistor and having a direction of conductivity opposite to that of the base-emitter path of said transistor for providing a low impedance conduction path across said second resistor in response to currents flowing from said first point of constant potential in a direction opposite to said unidirectional current flow.

References Cited

UNITED STATES PATENTS

| | | | |
|---|---|---|---|
| 2,949,545 | 8/1960 | White | 307—88.5 |
| 3,025,417 | 3/1962 | Campbell | 307—88.5 |
| 3,188,498 | 6/1965 | Gabor et al. | 307—88.5 |

JOHN S. HEYMAN, *Primary Examiner.*